(12) United States Patent
Anhut et al.

(10) Patent No.: US 11,525,989 B2
(45) Date of Patent: Dec. 13, 2022

(54) OPTICAL ASSEMBLY FOR SCANNING EXCITATION RADIATION AND/OR MANIPULATION RADIATION IN A LASER SCANNING MICROSCOPE, AND LASER SCANNING MICROSCOPE

(71) Applicant: Carl Zeiss Microscopy GmbH, Jena (DE)

(72) Inventors: Tiemo Anhut, Jena (DE); Matthias Wald, Jena (DE); Daniel Schwedt, Jena (DE); Tobias Kaufhold, Jena (DE); Beate Böhme, Großpürschütz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 337 days.

(21) Appl. No.: 16/641,543

(22) PCT Filed: Aug. 23, 2018

(86) PCT No.: PCT/EP2018/072816
§ 371 (c)(1),
(2) Date: Feb. 24, 2020

(87) PCT Pub. No.: WO2019/038404
PCT Pub. Date: Feb. 28, 2019

(65) Prior Publication Data
US 2021/0157113 A1    May 27, 2021

(30) Foreign Application Priority Data
Aug. 25, 2017   (DE) ..................... 10 2017 119 479.7

(51) Int. Cl.
*G02B 21/00*      (2006.01)

(52) U.S. Cl.
CPC ....... *G02B 21/0032* (2013.01); *G02B 21/006* (2013.01); *G02B 21/0048* (2013.01); *G02B 21/0068* (2013.01); *G02B 21/0076* (2013.01)

(58) Field of Classification Search
CPC .... G02B 21/00; G02B 21/006; G02B 21/008; G02B 21/0032; G02B 21/0048;
(Continued)

(56) References Cited

U.S. PATENT DOCUMENTS 5,691,839 A * 11/1997 Kobayashi ......... G02B 21/0068
359/368
7,715,078 B2    5/2010 Okugawa
(Continued)

FOREIGN PATENT DOCUMENTS

DE    102014017001 A1    5/2016
DE    102014017002 A1    5/2016
(Continued)

OTHER PUBLICATIONS

Dean et al., Deconvolution-free subcellular imaging with axially swept light sheet microscopy, Biophysic. J., vol. 108, 2807-2815 (2015) (9 pages).
(Continued)

*Primary Examiner* — Mustak Choudhury
(74) *Attorney, Agent, or Firm* — LaBatt, LLC (57) ABSTRACT

The invention relates to an optical assembly for scanning excitation radiation and/or manipulation radiation in a laser scanning microscope. The optical assembly according to the invention is characterized in that in addition to a first and a second focusing device, a third focusing device is provided in order to generate a third pupil plane which is optically conjugated to a first pupil plane, a third beam deflecting device is arranged on the third pupil plane in order to deflect the excitation radiation and/or manipulation radiation, a first
(Continued)

beam deflecting means is provided between the second focusing device and the second pupil plane and the second pupil plane and the third focusing device in order to deflect the excitation radiation and/or manipulation radiation coming from the third focusing device while bypassing the second beam deflecting device in the direction of the second focusing device, a fourth focusing device is provided for generating a fourth pupil plane which is optically conjugated to the third pupil plane, and a variable second beam deflecting means is arranged on the fourth pupil plane in order to switch an optical beam path between a first beam path and a second beam path. The invention additionally relates to a laser scanning microscope.

32 Claims, 4 Drawing Sheets

(58) Field of Classification Search
CPC ............ G02B 21/0068; G02B 21/0076; G02B 26/10; G02B 26/08; G02B 26/0833; G02B 26/101
See application file for complete search history.

(56) References Cited

U.S. PATENT DOCUMENTS

| | | | |
|---|---|---|---|
| 10,254,524 B2 | 4/2019 | Schwedt et al. | |
| 10,310,243 B2 | 6/2019 | Anhut et al. | |
| 2002/0041439 A1 | 4/2002 | Engelhardt et al. | |
| 2007/0152556 A1 | 7/2007 | Bohm et al. | |
| 2008/0316561 A1 | 12/2008 | Okugawa | |
| 2009/0147256 A1 | 6/2009 | Okugawa | |
| 2014/0320958 A1* | 10/2014 | Cooper | G02B 17/023 359/388 |
| 2016/0131881 A1* | 5/2016 | Boehme | G02B 21/006 359/385 |
| 2016/0187634 A1* | 6/2016 | Krampert | G02B 27/143 359/201.2 |
| 2016/0223882 A1* | 8/2016 | Krishnamachari | G02B 21/0068 |

FOREIGN PATENT DOCUMENTS

| | | |
|---|---|---|
| DE | 10050529 B4 | 6/2016 |
| DE | 102016102286 A1 | 8/2017 |
| EP | 1970744 A1 | 9/2008 |
| EP | 2042905 B1 | 4/2016 |
| WO | 2005054924 A1 | 5/2005 |

OTHER PUBLICATIONS

Archer-Zhang, et al., "Dynamic performance of microelectromechanical systems deformable mirrors for use in an active/adaptive two-photon microscope," J. Biomed. Opt. 21 (12), 121507, Oct. 12, 2016 (11 pages).
MFC Series High-Speed Adjustable Focus Mirrors, Copyright © 2017 Revibro Optics, LLC, Rev 5 (2 pages).
International Search Report and Written Opinion for International Application No. PCT/EP2018/02816 (no English translation available for Written Opinion), dated Dec. 10, 2018, 13 pages.
Search Report for Application No. DE 10 2017 119 479.7, (no english translation available), dated Jun. 20, 2018, 7 pages.
International Preliminary Report on Patentability for International Application No. PCT/EP2018/02816, dated Mar. 5, 2020, 8 pages.

\* cited by examiner

OPTICAL ASSEMBLY FOR SCANNING EXCITATION RADIATION AND/OR MANIPULATION RADIATION IN A LASER SCANNING MICROSCOPE, AND LASER SCANNING MICROSCOPE

In a first aspect, the present invention relates to an optical arrangement for scanning excitation radiation and/or manipulation radiation in a laser scanning microscope as per the preamble of claim 1. In a further aspect, the invention relates to a laser scanning microscope as per the preamble of claim 22.

A generic optical arrangement for scanning excitation radiation and/or manipulation radiation in a laser scanning microscope is described, for example, in DE 10 2014 017 001 A1 and comprises the following components: a scanning optical unit as a first focusing device for providing a first pupil plane, a first beam deflection device, formed by a first scanner disposed in the first pupil plane, for scanning the excitation radiation and/or manipulation radiation in a first coordinate direction, a second focusing device for generating a second pupil plane which is optically conjugated to the first pupil plane, and a second beam deflection device, disposed in the second pupil plane, for deflecting the excitation radiation and/or manipulation radiation.

A generic laser scanning microscope also emerges from DE 10 2014 017 001 A1 and comprises the following components: at least one laser light source for emitting laser radiation to excite and/or manipulate a sample, at least one principal color splitter for separating, firstly, excitation radiation and/or manipulation radiation and, secondly, wavelength-shifted detection light emanating from a sample, at least one microscope objective for guiding excitation radiation and/or manipulation radiation onto a sample and for guiding detection light emanating from the sample back in the direction of the principal color splitter, and comprises a detection module for detecting the detection light.

Laser scanning microscopy has become established as an indispensable tool of biomedical research. In addition to pure imaging, the optical manipulation of samples is becoming increasingly important.

A general technical problem here consists of generating, with the least possible effort, in the most compact possible installation space and with the lowest possible transmission losses, a plurality of optical pupils which are respectively imaged onto one another. Here, the number of usable pupils should be greater than or equal to three. It should be possible to switch between at least two of the pupils provided.

Known solutions are based, firstly, on the use of different ports on the limb. This is disadvantageous because it makes the microscope limb complicated and expensive. Furthermore, it may not be possible in that case to use other methods, such as high-resolution microscopy for example, on the same limb. In addition, complex adjustments often have to be carried out in order to align the respective image fields with one another.

As a rule, known solutions for a manipulation using just one scanning objective are mechanical and, as a consequence, often relatively slow. As a rule, it is hardly possible to switch relatively large masses, as represented by mirrors, faster than 10 ms. By contrast, relatively short switching times can be achieved using galvanometric scanners. However, attempts must be made to keep the moment of inertia low.

Switching between a plurality of scanners is disclosed in U.S. Pat. No. 7,715,078. In addition to the scanners required for the actual scanning, at least two further scanners are needed for switching the beam paths. Moreover, the explanations in said application disclose further imaging via refractive optics, which are presented as simple lenses. However, there is no possibility in this case to accommodate a z-scanning mirror in a fourth pupil. However, this is required for three-dimensional optical manipulation in particular. In said case, the optical elements have the degree of complexity of a scanning objective, which is complex and less light-efficient.

EP 2 042 905 B1 discloses a combination of two scanner pairs. Either one pair of scanners or the other pair of scanners can be selected in said case. However, individual axes cannot be added very quickly because the masses to be moved are comparatively large.

DE 100 50 529 B4 discloses the combination of a plurality of beam deflection units, each consisting of two beam deflection modules. Imaging optical units between the beam deflection devices are also described in the exemplary embodiments. However, there are no options for switching between various scan modes. Likewise, no means for influencing the wavefront are described.

An object of the present invention can be considered that of developing an optical arrangement that can be used to provide further pupil planes, with the intention being that only a little additional installation space is used. Moreover, it should be possible to switch back and forth between the pupil planes as quickly as possible. Finally, a laser scanning microscope with additional pupil planes should be developed, in which it is possible to switch back and forth as quickly as possible between the different pupil planes.

This object is achieved by means of the optical arrangement having the features of claim 1. In relation to the microscope, the object is achieved by the laser scanning microscope having the features of claim 22.

Advantageous variants of the optical arrangement according to the invention and of the laser scanning microscope according to the invention are the subject matter of the dependent claims and are also described below, in particular in connection with the figures.

According to the invention, the optical arrangement for scanning excitation radiation and/or manipulation radiation in a laser scanning microscope of the type set forth above is developed by virtue of the fact that a third focusing device is present for generating a third pupil plane which is optically conjugated to the first pupil plane, that a third beam deflection device for deflecting the excitation radiation and/or manipulation radiation is disposed in the third pupil plane, that a first beam deflection means for deflecting the excitation radiation and/or manipulation radiation, coming from the third focusing device, in the direction of the second focusing device while bypassing the second beam deflection device is present between, firstly, the second focusing device and the second pupil plane and, secondly, the second pupil plane and the third focusing device, that a fourth focusing device for generating a fourth pupil plane is present, said fourth pupil plane being optically conjugated to the third pupil plane, and that a variable second beam deflection means for switching an optical beam path between a first beam path and a second beam path is disposed in the fourth pupil plane.

According to the invention, the laser scanning microscope of the type set forth above is developed by virtue of the fact that an optical arrangement according to the invention for scanning excitation radiation and/or manipulation radiation is present.

Particularly preferably, the first beam path can run at least from the variable second beam deflection means to the first scanner via the third beam deflection device and the second beam deflection device. The second beam path can run, particularly preferably, at least from the variable second beam deflection means to the first scanner via the third beam deflection device and the first beam deflection means while bypassing the second beam deflection device.

In the context of the present description, an optical arrangement is an arrangement which comprises, in particular, beam-shaping components, such as lenses and concave mirrors, and beam-deflecting components, such as mirrors, which in particular can be movable.

The term scanning is understood to mean the controlled guidance of a beam of the excitation radiation or the manipulation radiation over a sample. This scanning can be carried out in a regular pattern, for example line by line, but in particular also along a trajectory to be specified.

For the purposes of this description, excitation radiation is understood to mean electromagnetic radiation, in particular visible light, but also infrared and ultraviolet radiation, which generally serves for imaging. As a rule, this excitation radiation is provided by lasers. Here, use can be made of different contrast methods. Particularly preferably, this relates to radiation for exciting a fluorescence from dyes with which a sample to be examined has been prepared. A laser scanning fluorescence microscope serves to measure this fluorescent light. In principle, however, it may also relate to illumination light for light microscopy.

Manipulation radiation refers to electromagnetic radiation, in particular in the visible range but also in the infrared and ultraviolet range, that can be used to bring about a deliberate change in a sample to be examined, in particular in a deliberately selected spatial area or along a deliberately selected trajectory, which should be predetermined.

The terms excitation radiation and excitation light on the one hand and manipulation radiation and manipulation light on the other are used synonymously in this description.

The term detection light is understood to mean light that is emitted by the sample on account of the excitation and that is intended to be detected using the entire optical arrangement. Detection light can be fluorescent light, in particular.

For the purposes of this description, a pupil plane is understood to mean an optical plane which, during an operational state of the optical arrangement, is optically conjugated in a laser scanning microscope to a back objective pupil of the microscope objective respectively in use. By way of example, for scanning purposes, the first, second, third and fourth pupil planes are optically conjugated to the back pupil of the microscope objective in one operating state of the arrangement according to the invention. Since the position of the back objective pupil varies, the pupil planes, as a rule, are only exactly optically conjugated to the back objective pupil for one objective. For the other objectives, the pupil planes are approximately optically conjugated to the back objective pupil.

In principle, for the realization of the invention, all that is important in respect of the relative position and orientation of the individual pupil planes with respect to one another is that these pupil planes are each imaged in one another and are accordingly optically conjugated to one another. The order of the pupil planes in the beam path is therefore arbitrary as a matter of principle. Advantageous variants of the optical arrangement according to the invention are characterized in that, in relation to the excitation radiation and the manipulation radiation, the second pupil plane is located upstream of the first pupil plane, the third pupil plane is located upstream of the second pupil plane, and the fourth pupil plane is located upstream of the third pupil plane.

In principle, any number of pupils can be generated with the arrangement according to the invention. However, important applications already benefit from four pupils imaged onto one another, which requires a manageable adjustment outlay and has low optical losses.

As a rule, the scanning optical unit, i.e., the first focusing device, consists of an arrangement of lenses which generate a first pupil plane that is equivalent to the back objective pupil.

Cartesian coordinates, in particular, are considered if coordinate directions are mentioned in the context of the present description. By way of example, the first coordinate direction can be the y-direction and the second coordinate direction can be the x-direction. A coordinate system is frequently chosen in such a way that the optical axis of a system coincides with the z-axis.

In principle, any focusing components, in particular also lenses or lens groups, can be used as the first, second, third and fourth focusing device for generating a pupil plane. Concave mirrors, in particular toric or spherical concave mirrors, are particularly preferably used as the second and/or third focusing device. Advantageously, the fourth focusing device can be a lens or a lens group.

Here, it can be particularly advantageous if the optical path over the first concave mirror is designed such that a magnification ($|V|>1$) or a reduction ($|V|<1$) is achieved. This is particularly advantageous if different scanners should be combined with one another. By way of example, it is known that resonant MEMS scanners can only reach certain diameters if the resonance frequency and dynamic mirror deformation are given. On the other hand, there is an optimal size for quasi-static galvanometer scanners which does not coincide with the size of the resonant MEMS scanner. An adjustment of the pupil diameter over a magnification level can be very useful for an optimal optical unification of both scanner systems. Deviations from a 1:1 imaging can be permitted within certain limits, as a result of which scanners of different sizes can optionally be present in the respective positions.

It is important for the second and third beam deflection device that the radiation is deflected in a defined manner. Particularly preferred variants are distinguished in that the second beam deflection device in the second pupil plane is a second scanner for scanning the excitation radiation and/or the manipulation radiation in a second coordinate direction that differs from the first coordinate direction and/or in that the third beam deflection device in the third pupil plane is a third scanner for scanning the excitation radiation and/or the manipulation radiation in a second coordinate direction that differs from the first coordinate direction.

The optical arrangement according to the invention is distinguished by great flexibility. By way of example, the second beam deflection device in the second pupil plane and/or the third beam deflection device in the third pupil plane could also be a stationary mirror, a mirror whose surface can be actively curved, or another wavefront-modifying element. Scanning in the z-direction can be carried out by varying the focusing when use is made of a mirror whose surface can be actively curved. As a rule, such a mirror is initially flat and can then be deformed, for example to form a concave mirror.

By way of example, the focusing along the optical axis, for example in the z-direction, can be modified using a wavefront-changing element and a z-scan can be carried out within this meaning. Moreover, such an element can compensate for aberrations due to refractive index mismatches at an increased depth of penetration in the sample.

In the context of the present description, scanners, for example first, second and third scanners, are understood to be devices with which a beam can be changed in its direction in at least one coordinate direction. Particularly preferably, pivotable mirrors are used as scanners.

In principle, all that is important for the employed scanners is that a beam deflection in the respective coordinate direction is carried out with the desired speed and accuracy. Particularly preferably, the second scanner is a resonance scanner and the third scanner is a quasi-static scanner. A particularly advantageous effect in this case is that the second scanner, i.e., the fast resonance scanner, is bypassed in the case of the second beam path; expressed differently, it is no longer effective. This means that the fast second scanner can be disconnected very quickly. In principle, the second and third scanners are interchangeable, i.e., it may also be expedient for the third scanner to be a resonance scanner and the second scanner to be a quasi-static scanner. Both variants can be advantageous in certain situations. Both variants allow very quick switching back-and-forth between an imaging mode, in which the fast scanner is used, and an excitation mode, which is carried out with the aid of the slow quasi-static scanner.

A quasi-static scanner refers to a scanner that is not operated resonantly but comparatively slowly, quasi-statically. In particular, a control curve can be impressed on a quasi-static scanner. This can be linearized, for example, so that the same dwell time can be assigned to each pixel. Resonant scanners only allow sinusoidal movements, but these can be significantly higher in frequency. A resonant scanner or resonance scanner is operated in a mechanical resonance, usually much faster in comparison than a quasi-static scanner. Both the quasi-static and the resonantly operated scanner can be implemented by a galvanometric scanner or a MEMS scanner.

In principle, acousto-optic devices, in particular acousto-optic scanners, can also be used for the beam deflection devices, in particular the scanners.

Since a fast scanner being available for one coordinate direction is generally sufficient for an imaging mode, the first scanner can also be a comparatively slow scanner and, in particular, a quasi-static scanner in a further advantageous variant.

However, a resonant scanner could also be placed in each of the pupils, the vibration axes being formed in such a way that the scanned lines in the sample advantageously, but not necessarily, form an angle of 90°. Consequently, the image field cannot be rotated continuously. However, adapting to a sample geometry is possible within certain limits. However, this mode requires the optical units, in particular the concave mirrors, to transmit a sufficiently large field.

Finally, the optical arrangement according to the invention also allows the area scanned by the resonant scanner to be displaced in the sample plane by means of the quasi-static galvoscanner (so-called "panning"). Consequently, it is possible to capture different regions of interest (ROI) and jump between these different "regions of interest".

In principle, a two-dimensional scanner, e.g., a two-dimensional MEMS scanner with a single pivot point, can also be disposed in the first pupil plane, which is spatially closest to the scanning optical unit.

What is important, as a matter of principle, in the case of the first beam deflection means is that the latter is positioned in the beam path in such a way that the radiation coming from the third focusing device, in particular the second concave mirror, is transmitted in the direction of the second focusing device, in particular the first concave mirror, while bypassing the second beam deflection device, in particular the second scanner. In a simple variant, this can be achieved by a fixedly positioned mirror or a plurality of fixedly positioned mirrors of suitable size.

However, in principle, the electromagnetic radiation could also be reflected or transmitted on the basis of a variable parameter, in particular the wavelength and/or polarization. In this aspect, the first beam deflection means can also be a dielectric and/or dichroic mirror.

The term variable second beam deflection means refers to a component which allows any type of adjustment or setting and, depending on said adjustment or setting, deflects incident light or incident radiation differently. In particular, variably adjustable mirrors are considered here.

Switching an optical beam path between a first beam path and a second beam path means that, depending on the switching state, the light or the radiation passes through either the first beam path or the second beam path. Here, the first and the second beam path are different; i.e., there are parts of the first beam path that are not part of the second beam path and vice versa.

The feature that the second beam deflection device, i.e., the second scanner in particular, is bypassed in the second beam path should convey that excitation and/or manipulation radiation which takes the second beam path does not come into contact with the second beam deflection device, for example with the second scanner. Accordingly, a possible movement of this second scanner has no influence on the excitation and/or manipulation radiation.

The present invention is particularly suitable for confocal laser scanning fluorescence microscopy. Here, a microscope objective serves both to guide and focus excitation radiation and/or manipulation radiation onto a sample or into an area of a sample and to guide and collimate detection light, which comes from the region of the sample illuminated by excitation radiation and/or manipulation radiation, back in the direction of the principal color splitter.

Within the scope of the present description, the term detection module refers to the component ultimately used to detect the detection light emitted by an illuminated sample. In particular, such a detection module comprises at least one radiation detector and, depending on the intended use, can comprise color filters and confocal stops, in particular.

A key concept of the present invention can be considered that of using suitable focusing means, in particular a concave mirror, to create a further pupil plane, in which, in particular, a further scanner, specifically a third scanner, can be disposed. A further basic idea of a variant of the invention then consists of using a variable beam deflection means to guide the beam of the excitation radiation and/or manipulation radiation either via a first beam path, which contains the second beam deflection device, in particular the second scanner, and the third beam deflection device, in particular the third scanner, or via a second beam path, which contains the third beam deflection device but bypasses the second beam deflection device. Particular advantages can now be achieved if the first-mentioned scanner for the specified coordinate direction and the second scanner for this coordinate direction are qualitatively different, particularly if the second scanner is a resonance scanner and the third scanner is a quasi-static scanner. With the help of the variable beam deflection means, the fast scanner can either be connected, specifically in the first beam path, or disconnected, specifically in the second beam path. Since, in principle, such switching of the beam path can implemented extremely quickly (in the order of magnitude of 1 ms and below), it is also possible to switch extremely quickly between the two beam paths, and hence between an imaging mode and a manipulation mode.

The arrangement according to the invention is extremely powerful and can be used to solve various problems.

The optical arrangement according to the invention is particularly suitable for use in a confocal laser scanning fluorescence microscope. Thus, the laser scanning microscope according to the invention can particularly preferably be a laser scanning fluorescence microscope, in particular a confocal laser scanning fluorescence microscope.

The optical arrangement according to the invention and the laser scanning microscope according to the invention can preferably be used for manipulating biological samples, in particular in three dimensions. However, applications in material microscopy are also conceivable.

The arrangement according to the invention is also usable for optical manipulation, laser scanning microscopy, light sheet microscopy and for other methods in which a sample is scanned by means of a laser beam.

A substantial advantage of the present invention consists of allowing, firstly, imaging or optical manipulation with quasi-static galvanic scanners, which are also referred to as galvo scanners, and, secondly, fast imaging using resonant scanners to be carried out in a laser scanning microscope.

In particular, the invention renders it possible to switch very quickly between a manipulation mode and imaging. In particular, this should be possible without having to additionally switch moving parts for switching the beam path into the beam path as this often leads to instabilities and other technical problems. Here very quickly means that the switchover can take place in the range of a few milliseconds (ms). Furthermore, a three-dimensional optical manipulation, for example a targeted spatial bleaching (keywords: FRAP; uncaging) or optogenetic switching of ion channels, etc., and a subsequent switchover to possibly very fast imaging is possible. For a three-dimensional optical manipulation, there is a need for an option to influence the three spatial degrees of freedom; in particular, three optical elements are required. Quasi-static galvoscanners are particularly advantageous for scanning in the plane, as these expose spatial regions in defined fashion within a given time and are thus able to deposit the necessary amounts of light energy, which are also referred to as light doses. By way of example, the third dimension can be addressed using a dynamic wavefront-curving mirror, which thus changes an axial focus position. Such components are also referred to as defocusing or z-scanning mirrors. On account of their geometric dimensions, these elements are complemented very well by optical mirror scanners. The movement of a focal volume in the direction of the z-coordinate is thus implemented by influencing the wavefront for a given beam direction (z-direction), in a fundamentally different way to lateral scan movements where the beam direction is adjusted via deflectable mirrors. During this adjustment, optical aberrations can be corrected simultaneously by certain mirrors. Should this be done to compensate for influences of the sample on the optical quality of the imaging, this can also be referred to as an adaptive correction.

The present invention can also be used advantageously under the boundary condition that imaging and manipulation should be implemented using the same scanning lens. Only one port is used on the microscope limb in this case.

Particular challenges arise for the objects described above if the wavelengths for manipulation and imaging should be identical. Color splitters can be used in the case, likewise of practical relevance, where the two wavelengths are different.

The present invention is distinguished by the fact that, as a matter of principle, it can be implemented with a multiplicity of wavelength combinations. Here, additional movable elements that have to be activated or deactivated or that have to be introduced into the beam path are not strictly necessary between the scanners.

The arrangement according to the invention can also be used, in particular, for laser material processing, in which a sample is scanned by a laser beam. In particular, a quick switchover between different modes and, in particular, between optical manipulation and imaging by way of laser scanning microscopy is possible here. In principle, use can be made of any combination of, firstly, the wavelength of the manipulation radiation and, secondly, the excitation radiation.

In addition to optical manipulation, xy/z-scanning systems are also very well suited to imaging any trajectories and planes in a three-dimensional sample. This is particularly advantageous if the intention is to quickly image defined structures within a volume, in particular using multi-photon excitation. By way of example, a neuron that follows an irregular course in a three-dimensional volume can be imaged. If this neuron should be imaged very quickly or if the signal transduction, e.g., Ca(2+) waves, should be optically measured along this neuron, then the optical arrangement according to the invention is able to follow this structure extending through the volume.

The present invention can also be used advantageously in so-called light sheet microscopy. This is old technology, which was developed by Zsigmondy and Siedentopf 1902/1903 at Carl Zeiss for colloid research. After the process was almost forgotten for a long time, it experienced a renaissance thanks to new works by E. Stelzer. This was stimulated, in particular, by the significant progress in the processing of digital data.

Scanning a sample with a laser beam is likewise a task in light sheet microscopy, at least in the embodiment that is not based on illumination with a cylindrical lens. Here, too, a plurality of pupils are particularly advantageous because, in addition to scanning the beam in two dimensions, dynamic beam shaping should also be carried out; see, for example, Dean et al.: Deconvolution-free subcellular imaging with axially swept light sheet microscopy, Biophysic. J., Vol. 108, 2807-2815 (2015)). The optical arrangement according to the invention and the laser scanning microscope according to the invention can also be used very advantageously here.

Moreover, the optical arrangement according to the invention can be used both for linear fluorescence excitation and for nonlinear fluorescence excitation, for example for multi-photon microscopy. All common and known methods are possible using the arrangement (2-, 3- or multi-photon fluorescence; CARS, SRS etc.). These days, two-photon microscopy is a standard method for examining living samples. Particularly in so-called neuro-imaging, three-dimensional manipulations of the sample play an essential role in the understanding of neurobiological processes in the brain of living animals.

In principle, the invention is implemented if it is possible to switch over between a first beam path and a second beam path and the first beam path runs from the variable second beam deflection means to the first scanner via the third beam deflection device and the second beam deflection device and the second beam path runs at least from the variable second beam deflection means to the first scanner via the third beam deflection device and the first beam deflection means while bypassing the second beam deflection device. Specific variants of the optical arrangement according to the invention are characterized in that the first beam path runs at least from the variable second beam deflection means to the first scanner via the fourth focusing device, the third beam deflection device, the third focusing device, the second beam deflection device and the second focusing device, and in that the second beam path runs at least from the variable second beam deflection means to the first scanner via the fourth focusing device, the third beam deflection device, the third focusing device, the first beam deflection means and the second focusing device while bypassing the second beam deflection device.

For the variable second beam deflection means, which only serves to switch between the first beam path and the second beam path, all that is important, in principle, is that the desired switching over can be carried out sufficiently quickly. In particularly preferred variants, the variable beam deflection means comprises a variably positionable mirror. Very light mirrors are particularly expediently used here so as to keep the masses to be moved, and hence the occurring and necessary forces, small. The variable positionability of the mirror allows, as a matter of principle, a variety of technical configurations.

In the case of comparatively uncomplicated variants, which are also distinguished by mechanically expedient properties, the mirror is a rotating mirror with a rotating device, in particular a galvanometric rotating device. In a first rotational position, in which the first beam path is selected, this rotating mirror reflects incident radiation differently than in a second rotational position, different from the first rotational position, in which the second beam path is selected. Particularly advantageously, the rotating device is a galvanometric rotating device. These can be achieved with comparatively low moments of inertia.

All that is important for the mirror per se is that the excitation and/or manipulation radiation is reflected sufficiently effectively. If different properties should be obtained for different wavelengths, it may be advantageous for the first beam deflection means and/or the variable second beam deflection means to have a dielectric mirror.

A particularly preferred embodiment variant of the optical arrangement according to the invention is distinguished in that the variable second beam deflection means comprises a wavelength-dependent and polarization-dependent dielectric and/or dichroic mirror, wherein this mirror transmits excitation radiation and/or manipulation radiation at a first wavelength and in a first polarization state, reflects excitation radiation and/or manipulation radiation at the first wavelength and in a second polarization state that differs from the first polarization state, and transmits or reflects fluorescent light at a red-shifted wavelength emitted by a sample, independently of the polarization state thereof.

By way of example, the first polarization state with respect to the dielectric and/or dichroic mirror can be s-polarization in this case and the second polarization state with respect to the dielectric and/or dichroic mirror can be p-polarization. The reverse assignment is also possible. Here, the first polarization state with respect to the mirror would be p-polarization and the second polarization state with respect to the mirror would be s-polarization.

The arrangement of such a dielectric and/or dichroic mirror in the beam path advantageously enables switching between the first beam path and the second beam path of the excitation radiation and/or the manipulation radiation by switching between s-polarization and p-polarization. To this end, suitable switching means for switching the polarization, for example a lambda/2 plate and/or an electro-optic manipulator, can be present in the laser scanning microscope according to the invention.

In principle, what is important for the first beam deflection means is that, as demanded by the claim, the excitation radiation or manipulation radiation coming from the third focusing device, in particular from the second concave mirror, is diverted in the direction of the second focusing device, in particular to the first concave mirror. Particularly advantageous variants of the optical arrangement according to the invention are characterized in that the first beam deflection means has at least one fixedly positioned mirror, in particular exactly two fixedly positioned mirrors.

In principle, all that is important when switching the beam paths is that the second beam deflection device, more particularly the second scanner, is bypassed. This can be realized in space-saving fashion and in a small installation space in embodiment variants where an alternative second pupil plane, which is optically conjugated to the first pupil plane, is formed in the second beam path, a further beam-deflecting and/or beam-shaping component, which is part of the first beam deflection means, being disposed in said alternative second pupil plane.

This further beam-deflecting and/or beam-shaping component can be, e.g., a mirror, in particular a stationary mirror.

The further pupil plane, specifically the alternative second pupil plane, also facilitates interventions in the wavefront of the excitation radiation and/or the manipulation radiation. In this aspect, it may be advantageous if the further beam-deflecting component is a mirror, the surface of which can be actively curved, or a segmented mirror or any other device for manipulating the wavefront, for example a spatial light modulator.

By way of example, the wavefront can be manipulated by elements of the type described in J. Biomed. Opt. 21 (12), 121507, Oct. 12, 2016, see FIG. 2 in particular, in such a way that refocusing in the sample is achieved at high speed.

As a rule, wavefront-changing elements of this type are introduced into the beam path using comparatively complex relay optics. Particularly for systems where confocal measurements should also be carried out, these relay optics lead to a considerable, and often unacceptable, loss of light and are also expensive and difficult to adjust. Apart from this, a quick switchover of the beam path between manipulation and imaging, in the manner described above is hardly possible with relay optics.

In this respect, too, the optical arrangement according to the invention also brings considerable improvements. A further mode, which supports three-dimensional manipulations, in particular, such as those used in optogenetics, can be provided by the arrangement according to the invention by virtue of introducing a fast wavefront-forming element, in particular in the alternative second pupil plane. Such elements are offered, for example, by Revibro Optics (Bozeman, Mont. 59717). Naturally, alternative components that provide a desired function but require an optical pupil plane for doing so are also possible here. With the quickly adjustable z-scan element, which can also be referred to as an adaptively defocusing element, optical manipulation or imaging in a three-dimensional volume can be implemented in combination with the quasi-static scanners.

In a further preferred embodiment variant of the optical arrangement according to the invention, a control unit is present for coordinated actuation of the first scanner, the second beam deflection device, the third beam deflection device and/or the variable second beam deflection means. Particularly preferably, this control unit can be a PC; however, in principle, this may also be any other component, in particular a programmable component, such as microcontroller.

Particularly preferably, the control unit can be configured for coordinated actuation of the first scanner, the second beam deflection device, the third beam deflection device and/or the variable second beam deflection means in such a way that, irrespective of whether the first or the second beam path is traversed, excitation radiation or manipulation radiation are applied to the same sample locations. In particular, an embodiment variant in which, depending on a position of the variable second beam deflection means, the first scanner is repositioned in such a way that, irrespective of whether the first beam path or the second beam path is traversed, excitation light or manipulation light is applied to the same location on the sample is preferred.

Moreover, the control unit can serve to actuate further components of the optical arrangement according to the invention, for example a device for switching or rotating the polarization and/or a device for manipulating the wavefront, such as a segmented mirror or a mirror whose surface can be actively curved.

In particularly advantageous configurations of the laser scanning microscope according to the invention, a device for multipoint illumination with a plurality of illumination channels is present.

By way of example, the device for multipoint illumination can comprise a multi-channel AOTF for controlling the individual illumination channels. Hence, in principle, the individual illumination channels can be set as desired in view of the wavelength and intensity of the radiation.

In a particularly preferred variant, one of the illumination channels is used for exciting and/or manipulating a sample and the further illumination channels are used for imaging.

To this end, variants of the laser scanning microscope according to the invention in which a device for manipulating the polarization, in particular for switching and/or rotating the polarization, more particularly a lambda/2 plate and/or an electro-optic manipulator, is present for at least one of the illumination channels are particularly preferred. With this device for manipulating the polarization, i.e., for switching the polarization, the beam path for at least one illumination channel can be switched back and forth between the first beam path and the second beam path.

Moreover, a particular advantage of the present invention is that, in principle, it can be used in various microscope techniques.

By way of example, the laser scanning microscope according to the invention can be configured for contrasting on the basis of at least one nonlinear contrast principle. In particular, the nonlinear contrast principle can be multiphoton fluorescence, for example 2- or 3-photon fluorescence, CARS (coherent anti-Stokes Raman scattering) or SRS (stimulated Raman scattering). Particularly preferably, the microscope according to the invention is a two-photon laser scanning microscope.

Particularly preferably, the microscope according to the invention can also be a confocal microscope, in particular a confocal laser scanning fluorescence microscope. A microscope is referred to as confocal if a pinhole is present in a plane that is conjugated to the image plane.

Due to the concentration of the excitation volume as a result of the non-linearity of the multi-photon fluorescence, such a confocal stop is not mandatory in a multi-photon scanning microscope or multi-photon fluorescence scanning microscope.

Further advantages and features of the invention are discussed below with reference to the schematic figures. In the figures.

As a rule, identical components and component with an equivalent effect are denoted by the same reference signs in all figures.

By way of example, the case where a spatially targeted manipulation is carried out in a sample by means of quasi-static scanners is considered below. Following this, there should be a very quick switchover to imaging. This is based on the fact that the intention is to record images of a certain size at a certain frame rate. In the case of laser scanning microscopes, this is possible using so-called resonance scanners, for example. For the subsequent example of FIG. 1, the further assumption is made that both the optical manipulation and the excitation of the fluorescence for the imaging are realized using a laser line at 488 nm, as this is a frequently occurring application.

Figure 1:
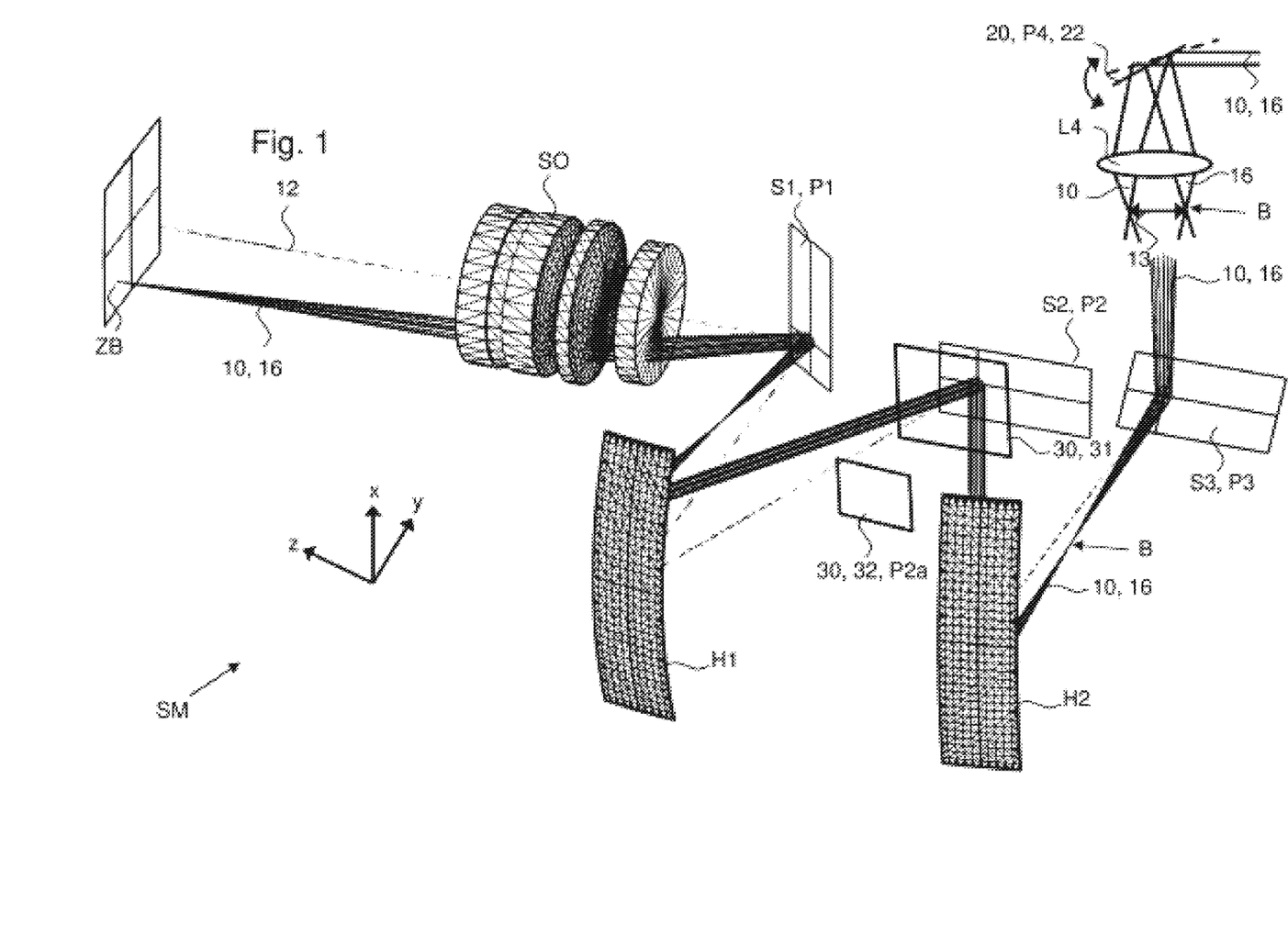
FIG. 1: shows a first exemplary embodiment of an optical arrangement according to the invention.

The object is achieved by an optical arrangement SM according to the invention for scanning excitation radiation and/or manipulation radiation in a laser scanning microscope, more particularly a laser scanning fluorescence microscope, as illustrated in FIG. 1. Here, three scanners S1, S2 and S3 are disposed in series, with all scanners being in an optical pupil imaging being achieved by all scanners imaging on one another. This is an essential point as this guarantees that the pupil remains stationary and an image field is recorded homogeneously, i.e., with very low so-called vignetting.

As an essential component, the optical arrangement SM initially has a scanning optical unit SO for providing a first pupil plane P1 as the first focusing device. In an operating state, i.e., in a state in which the optical arrangement SM interacts with a laser scanning microscope or is installed in said microscope, this first pupil plane P1 is optically conjugated to a back objective pupil P of the microscope objective (MO) (see FIG. 4). Disposed in this first pupil plane P1 is a first scanner S1 as the first beam deflection device, which serves to scan excitation radiation and/or manipulation radiation 10 in a first coordinate direction y. By way of example, the scanner S1 can be a quasi-static scanner, more particularly a galvanometric scanner. During operation, the schematically shown scanner mirror S1 is pivoted back and forth about a vertical axis in FIG. 1, i.e., an axis lying parallel to the x-axis.

Then, a second focusing device is present, which is a first concave mirror H1 in the shown example. This first concave mirror H1 serves to provide a second pupil plane P2 which is optically conjugated to the first pupil plane P1. In the second pupil plane P2, a second scanner S2 is disposed as second beam deflection device, which serves to scan the excitation radiation and/or the manipulation radiation in a second coordinate direction x that differs from the first coordinate direction y. The xyz-coordinate system shown schematically in FIG. 1 is a Cartesian coordinate system, i.e., the first coordinate direction y is perpendicular to the second coordinate direction x. The direction of the optical axis 12 extends parallel to the z-axis in the region between an intermediate image plane ZB and the scanning optical unit SO. By way of example, the second scanner S2 can be a resonance scanner. During operation, the scanner mirror S2 shown schematically in FIG. 1 is pivoted back and forth about an axis oriented parallel to the z-direction. This orientation of the axis of rotation is by no means mandatory. In general, the orientation depends on the angle at which the first scanner S1 is operated.

Particularly preferably, the axes of rotation of the scanners S2 and S3 lie in a plane which contains the optical axis of the scan objective and whose surface normal is parallel to the axis of rotation of the scanner S1. Here, the axis of the scanner S2 can be parallel to the optical axis of the scan objective, for example. However, deviations from these geometries are possible as a matter of principle and likewise represent embodiment variants of the invention described herein.

Furthermore, a third focusing device is present, which is a second concave mirror H2 in the shown example. The second concave mirror H2 serves to generate a third pupil plane P3 which is optically conjugated to the first pupil plane P1 and the second pupil plane P2.

In this third pupil plane P3, a third scanner S3 is disposed as third beam deflection device, which serves to scan the excitation radiation and/or the manipulation radiation in the second coordinate direction x as well. Like the first scanner S1, the third scanner S3 can be a quasi-static scanner, more particularly a galvanometric scanner. According to the invention, a first beam deflection means 30 for deflecting the excitation radiation 16 and/or manipulation radiation 10, coming from the second concave mirror H2, in the direction of the first concave mirror H1 while bypassing the second beam deflection device S2 is present between, firstly, the second focusing device, i.e., the first concave mirror H1 and the second pupil plane P2 and, secondly, the second pupil plane P2 and the third focusing device, i.e., the second concave mirror H2.

Moreover, according to the invention there is a fourth focusing device, which is shown schematically as lens L4 in the exemplary embodiment shown in FIG. 1. In principle, this could also be a further concave mirror, a lens group or a combination of these components. The fourth focusing device L4 serves to generate a fourth pupil plane P4, which is optically conjugated to the third pupil plane P3 and hence also optically conjugated to the preceding pupil planes P1 and P2. Then, a variable second beam deflection means 20 for switching an optical beam path between a first beam path and a second beam path is disposed in the fourth pupil plane P4. In the exemplary embodiment shown in FIG. 1, the variable second beam deflection means 20 is a rotating mirror 22, which comprises a rotating device (not illustrated here). By way of example, the rotating device can be implemented by a galvanometric scanner. This is advantageous since the moment of inertia can be kept relatively low.

With the aid of the rotating mirror 22, the direction of the incoming excitation radiation 16 or manipulation radiation 10, as shown schematically in FIG. 1, can be adjusted between at least two different directions. This adjustment of the direction in which excitation radiation 16 or manipulation radiation 10 incident on the rotating mirror 22 is transmitted ultimately brings about a switchover between a first beam path and a second beam path. In detail, a collimated beam incident on the rotating mirror 22 is guided to the lens L4 in different directions depending on the rotational position of the rotating mirror 22. As indicated schematically in FIG. 1, the lens L4 focuses these different beams at points B, which are spaced apart (illustrated by the double-headed arrow 13 in FIG. 1). The position of the points B in the beam path downstream of the third beam deflection device S3 is indicated in FIG. 1 by at least one arrow. According to the invention, the first beam bath extends at least from the variable second beam deflection means, i.e., the rotating mirror 22, to the first scanner S1 via the third scanner S3 and the second scanner S2. According to the invention, the second beam path runs at least from the rotating mirror 22 to the first scanner S1 via the third scanner S3 and the first beam deflection means 30 while bypassing the second beam deflection device, i.e., the second scanner S2. In the shown exemplary embodiment, the second scanner S2 is a resonance scanner, i.e., a component that moves very quickly.

What is essential is that the beam path via the second scanner S2, and hence the effect of this second scanner S2, is deactivated or switched off by actuating the variable beam deflection means 20. Thus, there is switching between the two-dimensional scans with and without a resonant scanner. In order to be able to facilitate the same pixel being addressed in both beam paths, the first scanner S1 can also switch the deflection angle, in particular in automated fashion by way of a control unit. In addition to the rasterization of the sample for image construction, the first scanner S1 thus also ensures switching of the beam path.

The structure of a laser scanning microscope according to the invention is explained with reference to FIG. 4. As essential components, the laser scanning microscope 100 illustrated schematically therein comprises a laser module LM, a principal color splitter HFT, an optical arrangement SM according to the invention for scanning excitation and manipulation light 10, a microscope objective MO and a detection module DM. The laser module LM serves as a radiation source for excitation light 16 and manipulation light 10. In the example schematically illustrated in FIG. 4, the excitation light 16 or manipulation light 10 emitted by the laser module LM strikes a multipoint module 40, which separates the incoming light beam into a plurality of beams that are ultimately focused in different focal volumes on or in a sample S. The spectral composition and the intensity can be set separately for the individual partial beams, for example using a multi-channel AOTF. The laser module LM, the multipoint module 40, the optical arrangement for scanning SM according to the invention, a nosepiece not illustrated here and the detection module DM are connected via connecting lines 71 to 75 to a control and evaluation unit PC, which can be a commercially available computer.

After passing through the multipoint module 40, the excitation light 16 or manipulation light 10 arrives, via the principal color splitter HFT, at the optical arrangement SM according to the invention for scanning the excitation light 16 and/or manipulation light 10. The scanning optical unit SO of the optical arrangement SM focuses the excitation light 16 or manipulation light 10 into an intermediate plane ZB. By means of further components, for example lenses and/or mirrors, which are not illustrated in FIG. 4, the excitation light 16 or the manipulation light 10 passes through a back objective pupil P into the microscope objective MO, which focuses the light into a plurality of focal volumes on or in the sample S situated in a sample plane SP. The number of separate focal volumes corresponds to the number of separate beams generated in the multipoint module 40. The excitation or manipulation light would be focused into one focal point if the multipoint module 40 was omitted. The focal volumes of the excitation or manipulation light 10 are scanned in the intermediate image plane ZB, and hence in the sample plane SP that is optically conjugated to the intermediate image plane ZB, using the scanning optical arrangement SM according to the invention.

Figure 4:
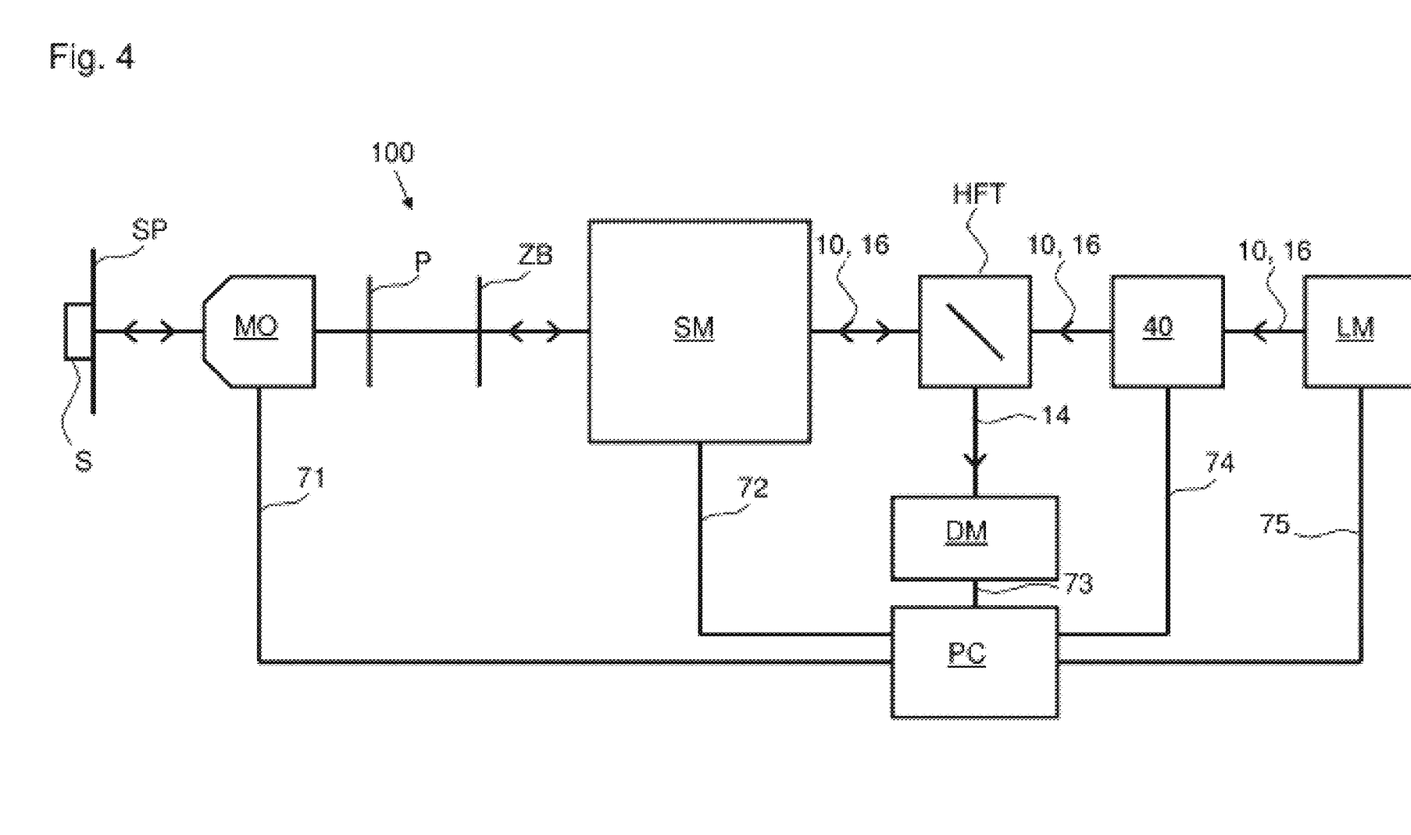
FIG. 4: shows a schematic illustration of a laser scanning microscope according to the invention.

In particular, the microscope shown schematically in FIG. 4 can be a confocal microscope. However, in principle, it could also be a microscope that uses at least one non-linear contrast principle. In the case of non-linear operation, the detection light can be detected as shown in FIG. 4; however, in principle, it can also be measured upstream of the scanning module SM.

In detail, the first and second beam path are explained with reference to FIG. 2. Without loss of generality, the second beam path is the beam path along which manipulation radiation 10 is guided in the direction of the sample S and the first beam path is accordingly the beam path along which excitation radiation 16 is guided onto the sample S in the example shown in FIG. 2.

Figure 2:
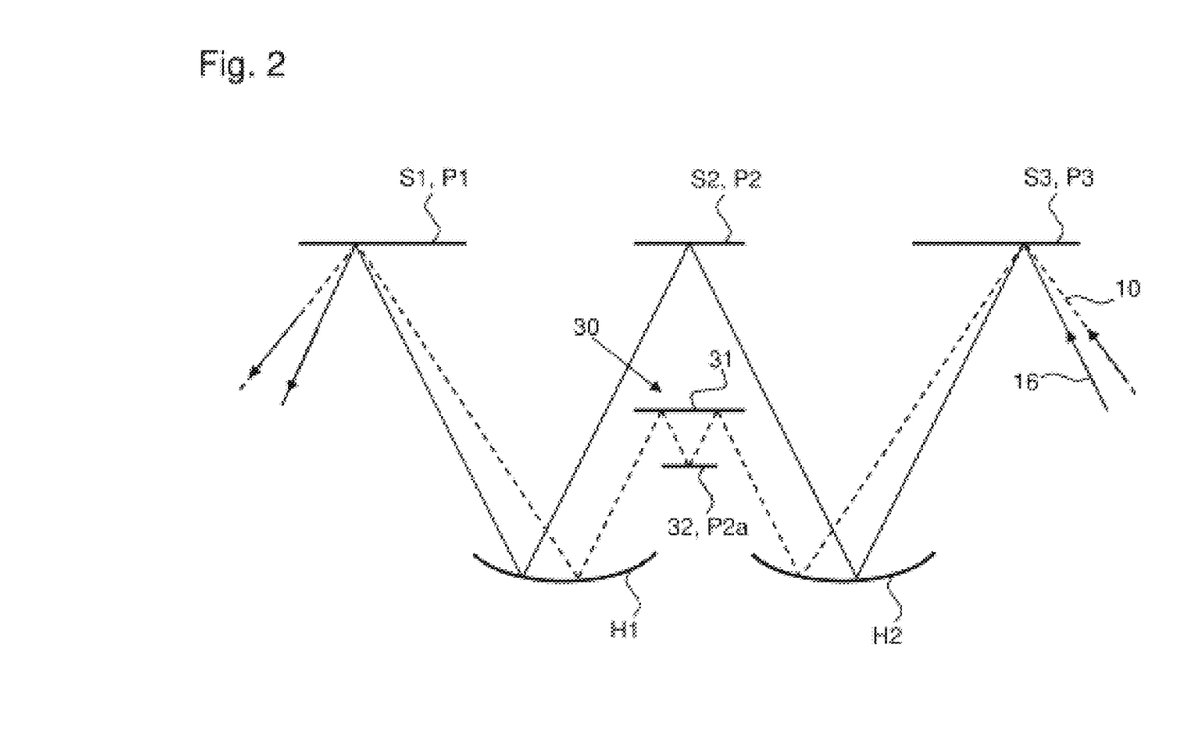
FIG. 2: shows a detail of the exemplary embodiment of FIG. 1.

Firstly, the second beam path, i.e., the beam path for manipulation radiation or manipulation light 10, which is used to bring about a defined manipulation in a sample S, for example defined bleaching along a specific trajectory, is now explained in the context of FIGS. 1 and 2. Once this bleaching has been carried out, the optical arrangement SM according to the invention can be quickly switched over, as will be explained below, and the sample can be observed in an imaging mode with the aid of excitation radiation 16.

Coming from the laser module LM, the manipulation radiation 10 firstly arrives at the third scanner S3 in the third pupil plane P3 via the rotating mirror 22, i.e., via the second variable beam deflection means 20 in the fourth pupil plane P4. In the exemplary embodiment schematically illustrated in FIGS. 1 and 2, the third scanner S3 is a quasi-static scanner, more particularly a galvanometric scanner, which scans the manipulation radiation 10 comparatively slowly in the x-direction. In the example of the optical arrangement for scanning SM according to the invention shown, the manipulation radiation 10 takes the second beam path, i.e., the manipulation radiation 10 does not come into contact with the second scanner S2 in the second pupil plane P2. Rather, the manipulation radiation 10 coming from the third scanner S3 passes via the second concave mirror H2 to a fixedly arranged mirror 31, which is part of the first beam deflection means 30. The manipulation radiation 10 is reflected by this fixedly arranged mirror 31 for a first time and then strikes another beam-deflecting component 32. In the example shown in FIG. 2, this further beam-deflecting component 32 is a further fixedly arranged mirror 32, which, together with the fixedly arranged mirror 31, forms the first beam deflection means 30. Particularly expediently, an alternative second pupil plane P2a, which is optically conjugated to the first pupil plane P1 and the third pupil plane P3, in particular, is formed in the second beam path and the further beam-deflecting component 32 is disposed in this alternative second pupil plane P2a. After reflection at the further fixedly arranged mirror 32, the manipulation radiation 10 strikes the fixedly arranged mirror 31 a second time and is then reflected by the latter in the direction of the first concave mirror H1. From the first concave mirror H1, the manipulation radiation 10 finally arrives at the sample S via the first scanner S1 in the first pupil plane P1, the scanning optical unit SO and the microscope objective MO. The first scanner S1 is likewise a quasi-static scanner, in particular galvanometric scanner, which scans the manipulation light 10 comparatively slowly in the y-direction. The point of incidence of the focal volume or the points of incidence of the focal volumes of the manipulation radiation 10 can accordingly be set in a targeted manner by setting the first scanner S1 in the first pupil plane P1 and the third scanner S3 in the third pupil plane P3.

In principle, an optical element for quick refocusing, such as is commercially available from Revibro Optics (Bozeman, Mont. 59717), or a mirror whose surface can be actively curved, can be disposed in the alternative second pupil plane P2a instead of the stationary mirror 31. Such variable components allow the focusing in the z-direction to be varied. Thus, in principle, three-dimensional trajectories or freely selected volumes in the sample S can also be manipulated by the manipulation radiation 10. Thus, a choice of 2-dimensional or 3-dimensional manipulation of the sample can be carried out.

After the manipulation has been completed, it may be desirable to switch the optical arrangement SM into an imaging mode as quickly as possible. For this purpose, the rotating mirror 22 is twisted in the fourth pupil plane P4 in such a way that the excitation radiation 16 coming from the direction of the laser module LM strikes the lens L4 in a different direction and consequently emerges from the lens L4 at a different location. This advance of the rotating mirror 22 leads to the excitation radiation 16 not taking the same path as the manipulation radiation 10 through the components of the optical arrangement SM according to the invention; i.e., it takes not the second beam path but the first beam path. The change in direction caused by the rotating mirror 22 and the dimensions and spatial position of the fixedly arranged mirror 31 are matched to one another in such a way that, in the exemplary embodiment shown in FIGS. 1 and 2, the excitation radiation 16 on the first beam path does not come into contact with the first beam deflection means 30, 31, 32.

In detail: Coming from the laser module LM, the excitation radiation 16 firstly arrives at the third scanner S3 in the third pupil plane P3 via the rotating mirror 22, i.e., via the second variable beam deflection means 20 in the fourth pupil plane P4. The third scanner S3 is a quasi-static scanner, in particular a galvanometric scanner, which scans the excitation radiation 16 comparatively slowly in the x-direction. The excitation radiation 16 coming from the third scanner S3 arrives at the second scanner S2 in the second pupil plane P2 via the second concave mirror H2. This second scanner S2 is a resonance scanner, which is much faster in comparison with the third scanner S3 and which also scans the excitation radiation 16 in the x-direction. Since the third scanner S3 is a quasi-static scanner, it can, in principle, be brought to a standstill very quickly, or scanning the excitation light 16 is in the x-direction implemented in combination by both the third scanner S3 and the second scanner S2. By way of example, the location of a certain field of view can be set using the quasi-static scanners S1 and S3, particularly if the travel of the second scanner S2 is limited, and quick scanning is then implemented using the second scanner S2. In this mode, the scan field can be moved in the x-direction by actuating the third scanner S3. However, in principle, the third scanner S3 can be at a standstill. The excitation radiation 16 is reflected by the second scanner S2 in the direction of the first concave mirror H1 and, coming from the concave mirror H1, it is finally incident on the first scanner S1 in the first pupil plane P1. From the first scanner S1, the excitation light 16 finally arrives at the sample S via the scanning optical unit SO and the microscope objective MO. The alternative second pupil plane P2a accordingly does not play a role for the first beam path. In the case of the first beam path, the point of incidence of the focal volume or the points of incidence of the focal volumes of the excitation radiation 16 can be set in a targeted manner by setting the first scanner S1 in the first pupil plane P1, the second scanner S2 in the second pupil plane P2 and the third scanner S3 in the third pupil plane P3.

The second pupil plane P2 and the alternative second pupil plane P2a can be equipped with various optically active or passive elements. In the simplest case, this is a mirror as soon as the other pupil contains an active element that should be bypassed. By way of example, as described, a resonant scanner can be in P2. If the latter is not required, no light should be passed thereover in order to avoid disturbances of the beam due to residual movements. In addition, a resonant scanner has a certain transient response. If the intention is to realize very fast switching between a manipulation mode and a fast imaging mode by way of a resonant scanner, the scanner must oscillate continuously and there is an optical switch to this movement at the appropriate time.

Figure 3:
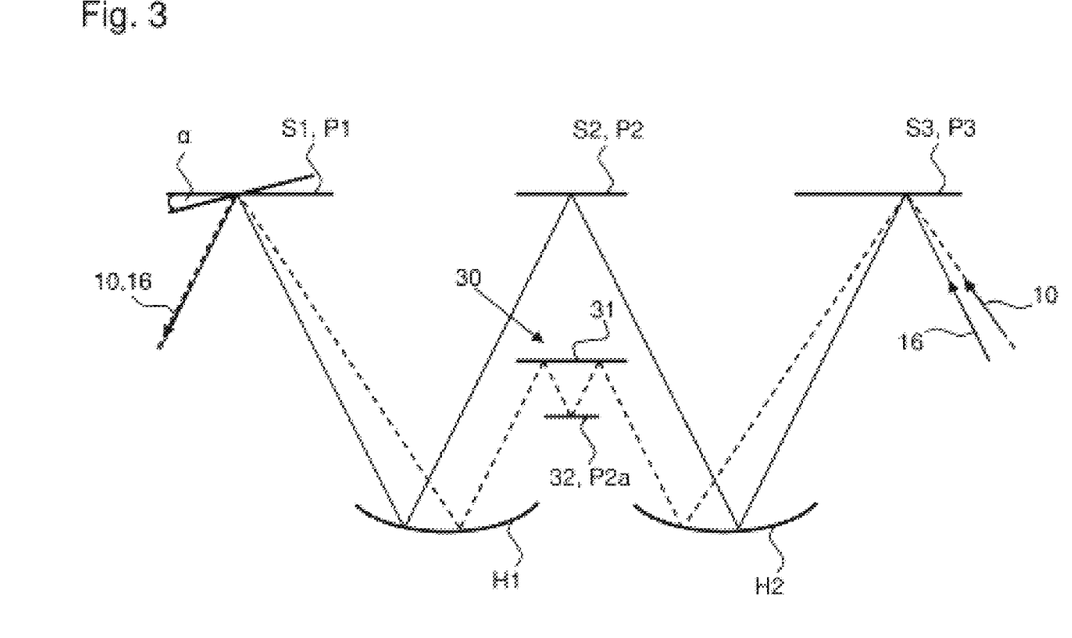
FIG. 3: shows the detail of FIG. 2 in an alternative operating position.

FIG. 3 shows a situation in which the first scanner S1, when switching from the first to the second beam path, is repositioned in such a way that the first beam path and the second beam path coincide again downstream of the first scanner S1. This means that, firstly, the excitation radiation 16 and, secondly, the manipulation radiation 10 are directed to the same location on a sample S, irrespective of whether the first or the second beam path is chosen.

This repositioning of the first scanner S1 or else, as an alternative or in addition thereto, the second scanner S2 and/or the third scanner S3 on the basis of a positioning of the switching device 20, i.e., of the rotating mirror 22 in the example shown, can be carried out using a suitably programmed control unit, for example.

There are important applications of fast imaging with resonant scanners, which require that the scan field of the resonant scanner be moved laterally over the sample (so-called "panning"). The optical arrangement according to the invention achieves this because the fast second scanner S2 and the quasi-static third scanner S3 can be used simultaneously. This is not possible in this way using the arrangement from DE 10 2014 017 001 A1.

At the second concave mirror H2, the angle between the incident and outgoing beam is preferably the same as the corresponding angle at the first concave mirror H1, and the axes of rotation of the second scanner S2 and the third scanner S3 are preferably parallel to one another. What this achieves is that, regardless of whether scanning is performed using the second scanner S2 or the third scanner S3 or both, no asymmetrical scan distortions arise when scanning in the sample plane (see DE 10 2014 017 001 A1 in this respect).

If the wavelengths of the manipulation radiation and the excitation radiation are the same, a mirror of suitably dimensioned dimensions, as shown in FIG. 2, can be present in the beam path as variable beam deflection means 30. This element need not necessarily be configured. In principle, it may remain in the beam path even during normal imaging. Consequently, no complicated mechanical adjustment is required in this case. Switching over is implemented by generating an angle between the beam incident on the first scanner S1 and the axis of rotation of the mirror, which then differs from 90°. Thereupon, the beam paths of the two operating modes (modulation mode: operation with modulation radiation; excitation mode or imaging mode: operation with excitation radiation) leave the third scanner S3 in the direction of the principal color splitter and a confocal pinhole at different angles. In order to avoid an incorrect offset at the pinhole, further angular switching can be undertaken at the same time in a descanned pupil plane (in particular, the fourth pupil plane P4) using a further galvanometric mirror (in particular second variable beam deflection device 20) not shown in the figure. This arrangement is suitable both for single-point scanning laser scanning microscopy and for multipoint methods, which require that all scanners are able to be disposed in well-defined optical pupils.

Following the excitation of the sample S by the excitation light 10, the sample S emits detection light 14 in a manner known per se, said detection light substantially propagating back to the principal color splitter HFT along the same optical beam path. To this end, the rotating mirror 22 must remain in the position belonging to the first beam path. The detection light 14 is typically fluorescent light, the wavelength of which is red-shifted in comparison with the wavelength of the excitation light 10 on account of a Stokes shift. This red shift allows the separation of the detection light 14 within the principal color splitter HFT and the detection light 14 arrives at the detection module DM, possibly via further components, not shown, such as mirrors or filters, and is quantitatively detected there. The measurement data of the detection module DM are fed to the control and evaluation unit PC.

A substantial advantage of the optical arrangement according to the invention is that it allows very fast switching between a so-called manipulation mode using manipulation radiation 10 and a fast imaging mode, in which excitation radiation 16 is used. This can be implemented in a number of ways.

The optical arrangement according to the invention, as shown in FIGS. 1 and 2, can be advantageously extended in a number ways.

By way of example, there currently is a resonant scanner in the pupil P2. By way of example, the alternative pupil plane P2a can be occupied by a fixed mirror. If the beam path is chosen in such a way that P2a is addressed, there can be a manipulation or imaging using the quasi-static scanner, bypassing the resonant scanner in the process. Alternatively, it is also advantageous to place optically active elements in P2a. By way of example, a wavefront-modulating element can be placed there, the latter being able to set a defocus very quickly.

Very advantageously, the switching mechanism of the optical arrangement according to the invention is combined with an active multipoint illumination, as described in DE 10 2016 102 286.1, for example. Here, for example, one of the multiple beams can have a polarization rotated through 90°. Then, this is the manipulation beam, which generally also has a higher intensity. All remaining beams are used for imaging. Switching using acousto-optic filter (AOTF) now leads to the desired switchover between the illumination beam paths for manipulation via the pupil P4 or for detection via the scanner S2 in the pupil P2.

LIST OF REFERENCE SIGNS x Second coordinate direction
y First coordinate direction
z Direction of the optical axis
B Focal spot
DM Detection module
HFT Principal beam splitter
H1 Second focusing device, first concave mirror
H2 Third focusing device, second concave mirror
L4 Fourth focusing device, lens or lens group
LM Laser module/light source
MO Microscope objective P Pupil plane of the microscope objective MO
PC Control and evaluation unit
P1 First pupil plane
P2 Second pupil plane
P2a Alternative second pupil plane
P3 Third pupil plane
P4 Fourth pupil plane
S Sample
SM Scanning module, optical arrangement according to the invention
SO Scanning optical unit, first focusing device
SP Sample plane
S1 First scanner, first beam deflection device
S2 Second scanner, second beam deflection device
S3 Third scanner, third beam deflection device
ZB Intermediate image plane
10 Manipulation radiation, manipulation light
12 Optical axis
13 Double-headed arrow
14 Detection light
16 Excitation radiation, excitation light
20 Second (variable) beam deflection means
22 Rotating mirror
30 First beam deflection means
31 Stationary mirror
32 Further beam-deflecting and/or beam-shaping component
40 Multipoint module
71-75 Lines from the microscope components to the PC
100 Laser scanning microscope

The invention claimed is:

1. A laser scanning microscope comprising:
at least one laser light source for emitting laser radiation to at least one of excite or manipulate a sample,
a microscope objective for guiding and focusing at least one of excitation radiation or manipulation radiation onto the sample,
a detection module for detecting detection light emanating from the sample, and
an optical arrangement for scanning at least one of excitation radiation or manipulation radiation, the optical arrangement including:
a scanning optical unit as a first focusing device for providing a first pupil plane,
a first beam deflection device, formed by a first scanner disposed in the first pupil plane, for scanning at least one of the excitation radiation or manipulation radiation in a first coordinate direction,
a second focusing device for generating a second pupil plane which is optically conjugated to the first pupil plane,
a second beam deflection device, disposed in the second pupil plane, for deflecting at least one of the excitation radiation or manipulation radiation,
a third focusing device for generating a third pupil plane which is optically conjugated to the first pupil plane,
wherein a third beam deflection device for deflecting at least one of the excitation radiation or manipulation radiation is disposed in the third pupil plane,
wherein a first beam deflection means for deflecting at least one of the excitation radiation or manipulation radiation coming from the third focusing device, in the direction of the second focusing device while bypassing the second beam deflection device is present between, firstly, the second focusing device and the second pupil plane and, secondly, the second pupil plane and the third focusing device,
a fourth focusing device for generating a fourth pupil plane which is optically conjugated to the third pupil plane,
wherein each of the first pupil plane, the second pupil plane, the third pupil plane, and the fourth pupil plane is optically conjugated to a back objective pupil of the microscope objective, and
wherein a variable second beam deflection means for switching an optical beam path between a first beam path and a second beam path is disposed in the fourth pupil plane.

2. The laser scanning microscope as claimed in claim 1, wherein the first beam path runs at least from the variable second beam deflection means to the first scanner via the third beam deflection device and the second beam deflection device, and
wherein the second beam path runs at least from the variable second beam deflection means to the first scanner via the third beam deflection device and the first beam deflection means while bypassing the second beam deflection device.

3. The laser scanning microscope as claimed in claim 1, wherein the first beam path runs at least from the variable second beam deflection means to the first scanner via the fourth focusing device, the third beam deflection device, the third focusing device, the second beam deflection device and the second focusing device, and
wherein the second beam path runs at least from the variable second beam deflection means to the first scanner via the fourth focusing device, the third beam deflection device, the third focusing device, the first beam deflection means and the second focusing device while bypassing the second beam deflection device.

4. The laser scanning microscope as claimed in claim 1, wherein, in relation to the excitation radiation and the manipulation radiation, the second pupil plane is located upstream of the first pupil plane, the third pupil plane is located upstream of the second pupil plane, and the fourth pupil plane is located upstream of the third pupil plane.

5. The laser scanning microscope as claimed in claim 1, wherein at least one of the second focusing device or the third focusing device is one of a concave mirror, a toric concave mirror, or a spherical concave mirror.

6. The laser scanning microscope as claimed in claim 1, wherein the fourth focusing device is a lens or a lens group.

7. The laser scanning microscope as claimed in claim 1, wherein the second beam deflection device in the second pupil plane is a second scanner for scanning the excitation radiation and/or the manipulation radiation in a second coordinate direction that differs from the first coordinate direction, and
wherein the third beam deflection device in the third pupil plane is a third scanner for scanning at least one of the excitation radiation or the manipulation radiation in a second coordinate direction that differs from the first coordinate direction.

8. The laser scanning microscope as claimed in claim 7, wherein the second scanner is a resonance scanner and the third scanner is a quasi-static scanner or
wherein the third scanner is a resonance scanner and the second scanner is a quasi-static scanner.

9. The laser scanning microscope as claimed in claim 1, wherein at least one of the second beam deflection device in the second pupil plane or the third beam deflection device in the third pupil plane is one of a stationary mirror, a mirror whose surface can be actively curved, or any other wavefront-modifying element.

10. The laser scanning microscope as claimed in claim 1, wherein the first scanner is a quasi-static scanner.

11. The laser scanning microscope as claimed in claim 1, wherein the first beam deflection means comprises at least one fixedly positioned mirror.

12. The laser scanning microscope as claimed in claim 1, wherein the second variable beam deflection means comprises a variably positionable mirror.

13. The laser scanning microscope as claimed in claim 12, wherein the variably positionable mirror is a rotating mirror with a rotating device.

14. The laser scanning microscope as claimed in claim 1, wherein at least one of the first beam deflection means or the variable second beam deflection means comprises at least one of a dielectric or a dichroic mirror.

15. The laser scanning microscope as claimed in claim 1, wherein the variable second beam deflection means comprises a mirror, wherein this mirror
    transmits at least one of excitation radiation or manipulation radiation at a first wavelength and in a first polarization state,
    reflects at least one of excitation radiation or manipulation radiation at the first wavelength and in a second polarization state that differs from the first polarization state, and
    transmits or reflects fluorescence light at a red-shifted wavelength emitted by a sample, independently of the polarization state thereof.

16. The laser scanning microscope as claimed in claim 15, wherein the first polarization state with respect to the mirror is s-polarization and
    wherein the second polarization state with respect to the mirror is p-polarization.

17. The laser scanning microscope according to claim 15, wherein the mirror is at least one of a wavelength-dependent mirror, a polarization-dependent dielectric mirror, or a dichroic mirror.

18. The laser scanning microscope as claimed in claim 1, wherein an alternative second pupil plane, which is optically conjugated to the first pupil plane, is formed in the second beam path, a further component which is at least one of beam-deflecting or beam-shaping, and which is part of the first beam deflection means, being disposed in said alternative second pupil plane.

19. The laser scanning microscope as claimed in claim 18, wherein the further component is a mirror.

20. The laser scanning microscope as claimed in claim 19, wherein the further component is one of a mirror, the surface of which can be actively curved, a segmented mirror, a spatial light modulator, or any other device for manipulating the wavefront.

21. The laser scanning microscope as claimed in claim 1, wherein a control unit is present for coordinated actuation of at least one of the first scanner, the second beam deflection device, the third beam deflection device or the variable second beam deflection means.

22. The laser scanning microscope as claimed in claim 21, wherein the control unit is configured for coordinated actuation of at least one of the first scanner, the second beam deflection device, the third beam deflection device or the variable second beam deflection means in such a way that, irrespective of whether the first or the second beam path is traversed, excitation radiation or manipulation radiation are applied to the same sample locations.

23. The laser scanning microscope as claimed in claim 1, further comprising
    at least one principal color splitter for separating, firstly, at least one of excitation radiation or manipulation radiation and, secondly, wavelength-shifted detection light emanating from a sample,
    wherein the at least one microscope objective is further for guiding and collimating detection light emanating from the sample back in the direction of the principal color splitter.

24. The laser scanning microscope as claimed in claim 1, wherein a device for multipoint illumination with a plurality of illumination channels is present.

25. The laser scanning microscope as claimed in claim 24, wherein the device for multipoint illumination comprises a multi-channel AOTF for controlling the individual illumination channels.

26. The laser scanning microscope as claimed in claim 24, wherein a device for rotating the polarization is present for at least one of the illumination channels.

27. The laser scanning microscope as claimed in claim 1, which is configured for contrasting on the basis of at least one of the following nonlinear contrast principles: multi-photon fluorescence, two-photon fluorescence, three-photon fluorescence, CARS, or SRS.

28. The laser scanning microscope as claimed in claim 1, which is a confocal laser scanning fluorescence microscope.

29. The laser scanning microscope according to claim 1, which is a laser scanning fluorescence microscope.

30. An optical arrangement for scanning at least one of excitation radiation or manipulation radiation in a laser scanning microscope, the optical arrangement comprising:
    a scanning optical unit as a first focusing device for providing a first pupil plane,
    a first beam deflection device, formed by a first scanner disposed in the first pupil plane, for scanning at least one of the excitation radiation or manipulation radiation in a first coordinate direction,
    a second focusing device for generating a second pupil plane which is optically conjugated to the first pupil plane,
    a second beam deflection device, disposed in the second pupil plane, for deflecting at least one of the excitation radiation or manipulation radiation,
    a third focusing device for generating a third pupil plane which is optically conjugated to the first pupil plane,
    wherein a third beam deflection device for deflecting at least one of the excitation radiation or manipulation radiation is disposed in the third pupil plane,
    wherein a first beam deflection means for deflecting at least one of the excitation radiation or manipulation radiation, coming from the third focusing device, in the direction of the second focusing device while bypassing the second beam deflection device is present between, firstly, the second focusing device and the second pupil plane and, secondly, the second pupil plane and the third focusing device,
    a fourth focusing device for generating a fourth pupil plane which is optically conjugated to the third pupil plane,
    wherein a variable second beam deflection means for switching an optical beam path between a first beam path and a second beam path is disposed in the fourth pupil plane, and
    wherein the variable second beam deflection means comprises a mirror, wherein this mirror transmits at least one of excitation radiation or manipulation radiation at a first wavelength and in a first polarization state, reflects at least one of excitation radiation or manipulation radiation at the first wavelength and in a second polarization state that differs from the first polarization state, and transmits or reflects fluorescence light at a red-shifted wavelength emitted by a sample, independently of the polarization state thereof.

31. The optical arrangement as claimed in claim 30,
wherein the first polarization state with respect to the mirror is s-polarization and
wherein the second polarization state with respect to the mirror is p-polarization.

32. The optical arrangement as claimed in claim 30,
wherein the mirror is at least one of a wavelength-dependent mirror, a polarization-dependent dielectric mirror, or a dichroic mirror.

\* \* \* \* \*